US010095786B2

(12) United States Patent
Song et al.

(10) Patent No.: US 10,095,786 B2
(45) Date of Patent: Oct. 9, 2018

(54) TOPICAL BASED MEDIA CONTENT SUMMARIZATION SYSTEM AND METHOD

(71) Applicant: OATH INC., New York, NY (US)

(72) Inventors: Yale Song, New York, NY (US); Jordi Vallmitjana, New York, NY (US); Amanda Stent, New York, NY (US); Alejandro Jaimes, Brooklyn, NY (US)

(73) Assignee: OATH INC., New York, NY (US)

( * ) Notice: Subject to any disclaimer, the term of this patent is extended or adjusted under 35 U.S.C. 154(b) by 545 days.

(21) Appl. No.: 14/682,654

(22) Filed: Apr. 9, 2015

(65) Prior Publication Data

US 2016/0299968 A1    Oct. 13, 2016

(51) Int. Cl.
*G06F 7/02* (2006.01)
*G06F 17/30* (2006.01)

(52) U.S. Cl.
CPC .. *G06F 17/30843* (2013.01); *G06F 17/30719* (2013.01); *G06F 17/30722* (2013.01)

(58) Field of Classification Search
CPC ......... G06F 17/30719; G06F 17/30843; G06F 17/30722; G06F 17/30837
See application file for complete search history.

(56) References Cited

U.S. PATENT DOCUMENTS

| 6,331,859 B1* | 12/2001 | Crinon ............. G06F 17/30799 345/619 |
| 2011/0047163 A1* | 2/2011 | Chechik ............ G06F 17/30781 707/741 |
| 2011/0274355 A1* | 11/2011 | Oami ................ G06F 17/30256 382/190 |
| 2015/0006752 A1* | 1/2015 | O'Hare ............... H04L 65/4069 709/231 |
| 2016/0142794 A1* | 5/2016 | Yoo ...................... G11B 27/036 386/282 |
| 2016/0283585 A1* | 9/2016 | Zheng ............... G06F 17/30675 |

* cited by examiner

*Primary Examiner* — Bruce M Moser
(74) *Attorney, Agent, or Firm* — James J. DeCarlo; Greenberg Traurig, LLP

(57) ABSTRACT

Disclosed herein is an automated approach for summarizing media content using descriptive information associated with the media content. For example and without limitation, the descriptive information may comprise a title associated with the media content. One or more segments of the media content may be identified to form a media content summary based on each segment's respective similarity to the descriptive information, which respective similarity may be determined using a media content and auxiliary data feature spaces. A shared dictionary of canonical patterns generated using the media content and auxiliary data feature spaces may be used in determining a media content segment's similarity to the descriptive information.

36 Claims, 9 Drawing Sheets

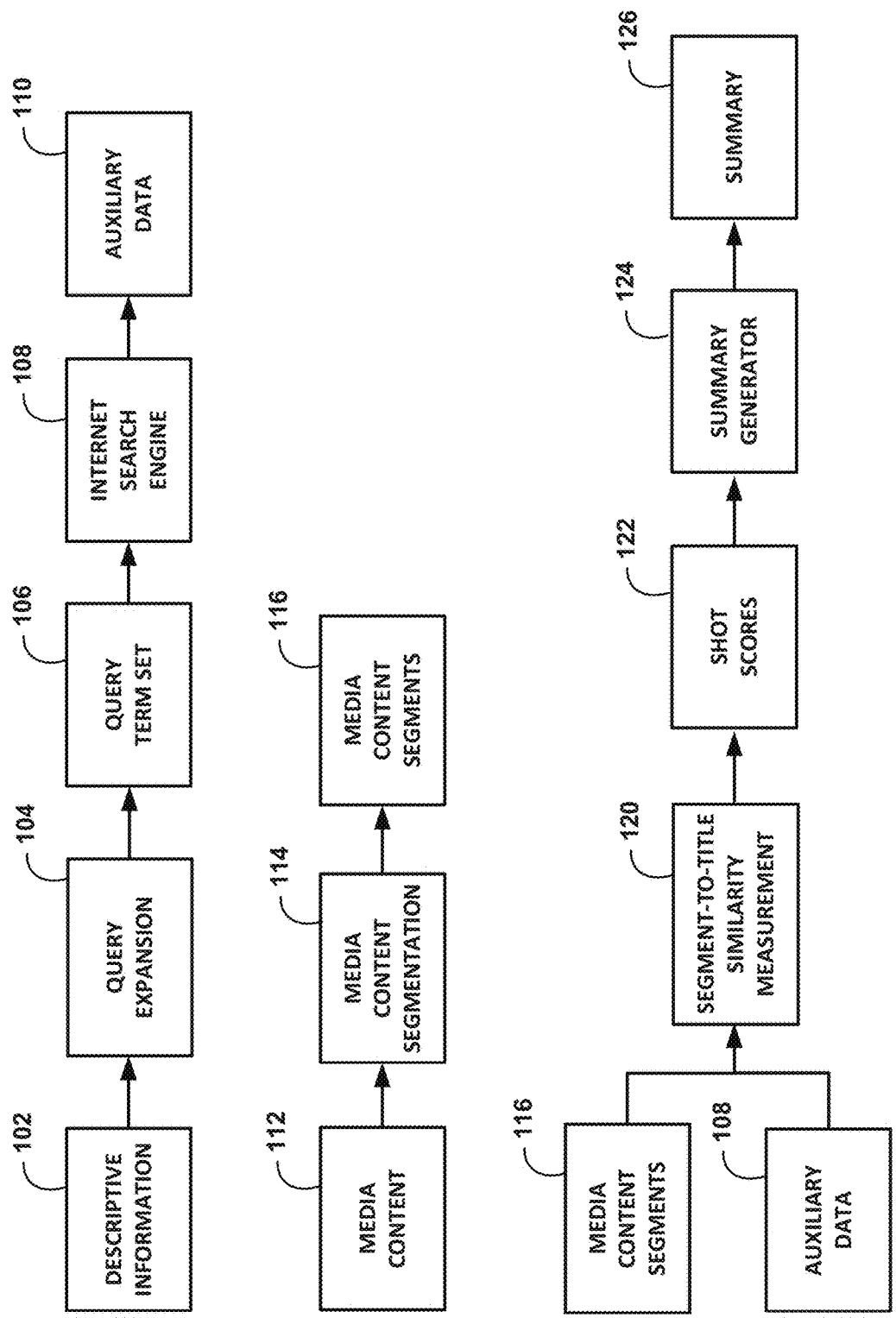

FIGURE 3

TOPICAL BASED MEDIA CONTENT SUMMARIZATION SYSTEM AND METHOD

FIELD OF THE DISCLOSURE

The present disclosure generally relates to summarization of media content, such as and without limitation video content, using associated descriptive data, or metadata, such as an associated title or other data, to determine a topical representation topical information about the media content, which topical information is used in generating a media content summary.

BACKGROUND

There is a vast amount of media content available to computer users. For example, a computer user has access to media content, in a digital form, from many different providers via a network such as the internet. Media content may also be available locally to the computer user, such as on a CD-ROM, hard disk, or other storage medium. While the computer user can access a vast amount of media content, the computer user is faced with a problem of identifying the media content that the computer user wishes to access.

SUMMARY

A summary of a media content item can facilitate a user's identification of a media content item; however, it is beneficial if the summary is an accurate representation of the media content item. Given the sheer amount of available media content, it is not feasible to use a supervised, manual, etc. technique to identify the media content segment(s) of each media content item to use in generating a media content summary for the media content item. Consequently, an automated mechanism that uses an unsupervised approach is needed to automatically identify one or more segments of a media content item that are used to automatically generate a media content summary of the media content item.

Embodiments of the present disclosure provide an unsupervised media content summarization approach, which uses data, e.g., metadata or other data associated with a media content item to identify one or more segments of the media content item that are considered to be important. The identified segment(s) of the media content item can be used to generate a summary of the media content item. In accordance with one or more embodiments, the data that is used to identify the one or more segments comprises the title of the media content item.

In accordance with one or more embodiments, the segment(s) considered to be important for a summary of a media content item can be differentiated from other segment(s) of the media content item using a feature space comprising features of the media content and a feature space comprising features of a set of other media content items, which set may be referred to as auxiliary data or auxiliary data set, identified using the media content item's associated data. In accordance with one or more embodiments, the features spaces may be used to generate a feature dictionary comprising a set of canonical features representing both the media content item and the auxiliary data. The feature dictionary represents a topic, e.g., a main topic, of the media content item.

A similarity score generated for each segment of the media content item can be used to identify one or more of the media content item's segments that are most similar, e.g., having the highest similarity scores relative to other segments of the media content item, to the media content item's topic(s), which may be determined using the media content's associated data and the auxiliary data obtained using the associated data.

In accordance with one or more embodiments, a method is provided, the method comprising obtaining, using at least one computing device, a plurality of items of auxiliary data using descriptive information associated with a media content item, the media content item comprising a plurality of units; generating, using the at least one computing device, a media content item feature space and an auxiliary data feature space; identifying, using the at least one computing device, a plurality of segments of the media content item, each segment comprising at least one unit of the media content item's plurality of units; scoring, using the at least one computing device, each segment of the plurality of segments of the media content items using the media content item feature space and the auxiliary data feature space, each segment's score representing a measure of similarity of the segment to the descriptive information; identifying, using the at least one computing device, at least one segment of the plurality of segments of the media content item as more similar to the descriptive information relative to others of the plurality of segments using the scoring of the plurality of segments; and generating, using the at least one computing device, a media content item summary comprising the at least one segment of the plurality identified as being more similar to the descriptive information.

In accordance with one or more embodiments a system is provided, which system comprises at least one computing device, each computing device comprising one or more processors and a storage medium for tangibly storing thereon program logic for execution by the processor, the stored program logic comprising obtaining logic executed by the one or more processors for obtaining a plurality' of items of auxiliary data using descriptive information associated with a media content item, the media content item comprising a plurality of units; generating logic executed by the one or more processors for generating a media content item feature space and an auxiliary data feature space; identifying logic executed by the one or more processors for identifying a plurality of segments of the media content item, each segment comprising at least one unit of the media content item's plurality of units; scoring logic executed by the one or more processors for scoring each segment of the plurality of segments of the media content items using the media content item feature space and the auxiliary data feature space, each segment's score representing a measure of similarity of the segment to the descriptive information; identifying logic executed by the one or more processors for identifying at least one segment of the plurality of segments of the media content item as more similar to the descriptive information relative to others of the plurality of segments using the scoring of the plurality of segments; and generating logic executed by the one or more processors for generating a media content item summary comprising the at least one segment of the plurality identified as being more similar to the descriptive information.

In accordance with yet another aspect of the disclosure, a computer readable non-transitory storage medium is provided, the medium for tangibly storing thereon computer readable instructions that when executed cause at least one processor to obtain a plurality of items of auxiliary data using descriptive information associated with a media content item, the media content item comprising a plurality of units, generate a media content item feature space and an auxiliary data feature space; identify a plurality of segments of the media content item, each segment comprising at least one unit of the media content item's plurality of units; score each segment of the plurality of segments of the media content items using the media content item feature space and the auxiliary data feature space, each segment's score representing a measure of similarity of the segment to the descriptive information; identify at least one segment of the plurality of segments of the media content item as more similar to the descriptive information relative to others of the plurality of segments using the scoring of the plurality of segments; and generate a media content item summary comprising the at least one segment of the plurality identified as being more similar to the descriptive information.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides a schematic overview depicting a flow for use in accordance with one or more embodiments of the present disclosure.

FIG. 2 illustrates canonical, or co-archetypal, patterns in accordance with one or more embodiments of the present disclosure.

FIG. 3 provides illustrative pseudocode for use in accordance with one or more embodiments of the present disclosure.

FIG. 4, which comprises FIGS. 4A, 4B and 4C, provides an illustrative process flow in accordance with one or more embodiments of the present disclosure.

DETAILED DESCRIPTION

Figure 1B:
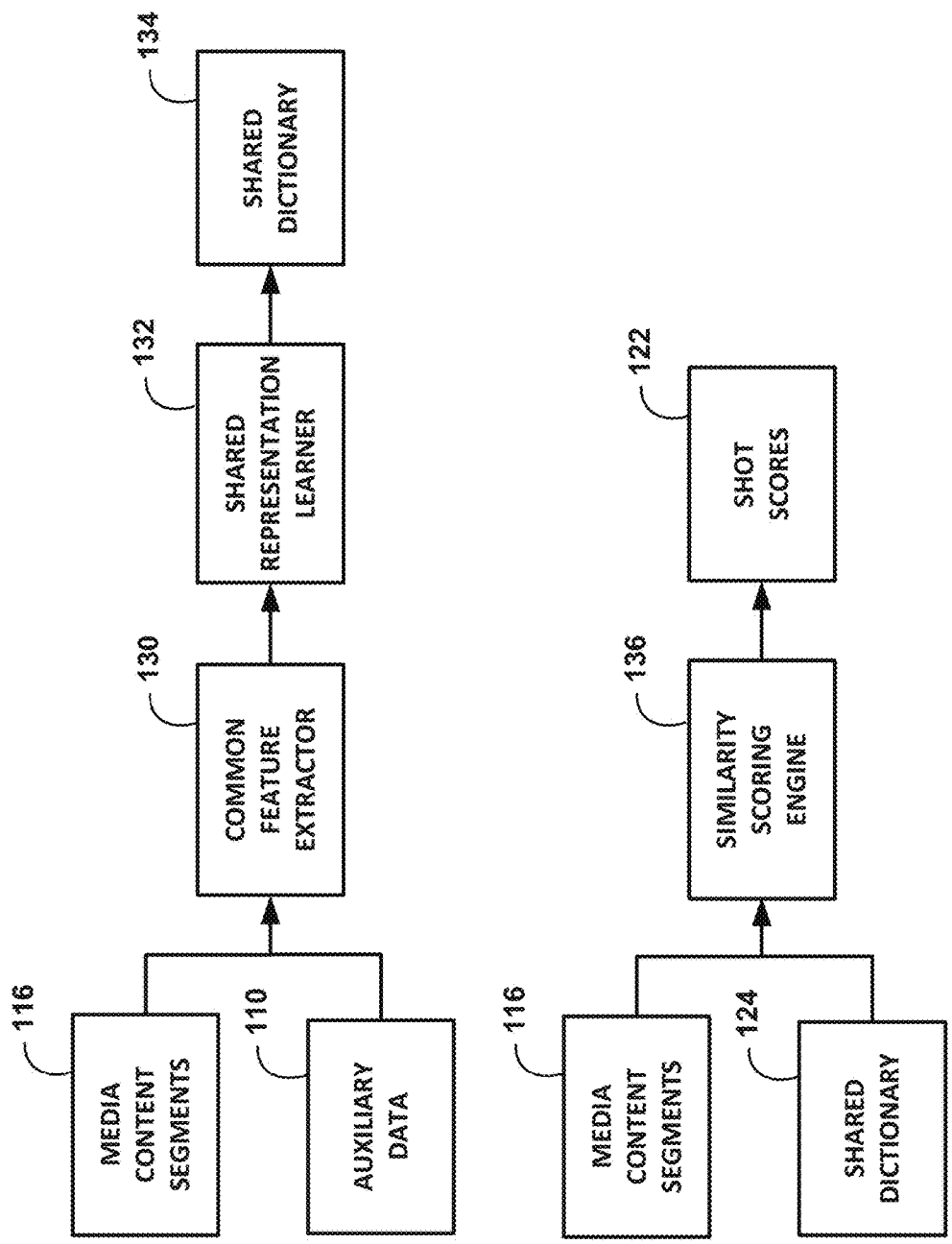

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a topical-based media content summarization system, method and architecture. In accordance with one or more embodiments, the segment(s) considered to be important for a summary of a media content item can be differentiated from other segment (s) of the media content item using a feature space generated for the media content item and a feature space generated for a set of other media content items. The set of other media content items, which set may be referred to as auxiliary data or auxiliary data set, is identified using the media content item's associated descriptive information.

In accordance with one or more embodiments, the media content and auxiliary data feature spaces may be used to identify one or more segments of the media content to include in a summary of the media content. In accordance with one or more alternative embodiments, the media content and auxiliary data features spaces may be used to generate a shared dictionary comprising a set of canonical features representing both the media content item and the auxiliary data, which may be used to identify one or more segments of the media content to include in a summary of the media content. The feature dictionary represents a topic, e.g., a main topic, of the media content item.

In accordance with one or more embodiments, a segment may be selected for inclusion in a media content's summary based on a determined measure of its similarity to descriptive information associated with the media content. In accordance with one or more embodiments, a segment comprises one or more units of the media content that is being summarized, e.g., a segment of a video can comprise one or more frames. In accordance with one or more embodiments, a similarity score may be generated for each unit of the media content, and a segment's measure of similarity may be determined using the scores generated for the unit(s) that are part of the segment.

In accordance with one or more embodiments, a unit-level similarity to the media content's descriptive information may be determined using the feature spaces alone or, in a case that the media content is considered to possess more than a certain amount of noise or variance, in combination with the shared dictionary. In accordance with one or more embodiments, each segment's measure of similarity to the media content's descriptive information may be used to identify one or more of the media content item's segments that are most similar, e.g., having the highest similarity scores relative to other segments of the media content item, to the media content item's descriptive information.

Embodiments of the present disclosure are discussed herein in connection with a video content item, or video, and a title associated with the video. It should be apparent that embodiments of the present disclosure may be used to generate summaries of other types of media content items, such as audio and audiovisual media content items, using any data associated with the media content item(s).

In accordance with one or more embodiments, data, such as a title and/or other data, associated with a video content item is used to identify the auxiliary data. In accordance with one or more such embodiments, the title may be used as an expression of a topic, e.g., a main topic, of the associated video. They title is often chosen to describe its main topic in order to draw people's attention, and thus serves as a strong prior on an expected summary. The auxiliary data may be collected, e.g., from the web, using a set of query terms derived from the title. The auxiliary data, together with segments of the video, e.g., video shots, may be used to form a feature space shared between the video segments and the title.

FIG. 1, which comprises FIGS. 1A and 1B, provides a schematic overview depicting a flow for use in accordance with one or more embodiments of the present disclosure. The example flow uses descriptive information 102 and media content item 112 as input. Descriptive information 102 can be any data associated with the media content item 112, such as a title, or other data or metadata associated with the media content item 112. As discussed herein and without limitation, the descriptive information 102 may comprise a title of a video media content item, or video, 112. While embodiments of the present disclosure are described in connection with a title and a video, it should be apparent that any data associated with any type of media content item is contemplated in connection with embodiments of the present disclosure.

The descriptive information 102 is processed, e.g., by a query expander 104, to extract a set of query terms 106 from the descriptive information 102. By way of a non-limiting example, one or more query expansion techniques may be used to generate the query terms set 106 from the title 102.

By way of a further non-limiting example, query terms set 104 may be generated from the title 102 by tokenizing the descriptive information 102 using common delimiters, such as, comma, period, colon, semi-colon, etc. Stop words and special characters may be removed from the resulting tokens. The resulting tokens are added to the query terms set 106. Additionally, query terms set 106 may comprise a set of words generated by taking N-grams of the tokens, where N is some number, such as without limitation a value of 3.

The query term set 106 is input to one or more search engines, e.g., an internet search engine, 108 to generate a search result set of auxiliary data 110. By way of a non-limiting example, the auxiliary data may comprise a set of images, audio content items, etc. relevant to the query terms set 106 generated using the descriptive information, e.g., title, 102 associated with the media content item, e.g., video, 112. By way of a non-limiting example, the auxiliary data 110 may comprise some number, e.g., 2000, of images for a video media content item 112. It should be apparent that any number of items, which may images, may be included in the auxiliary data 112.

The media content 112 may be processed by media content segmentation 114 to generate a set of media content segments 116. By way of a non-limiting example, media content item 112 can be a video content item and media content segmentation 114 can be a shot boundary detector that detects shot boundaries and segments the video 112 into shots based on the detected shot boundaries. Each shot comprises a sequence of successive, coherent, e.g., visually coherent, frames. By way of a non-limiting example, the content of the video 112 may be analyzed to identify transition frames, such as, fade in/out, dissolve, wipe and the like, in the video 112. By way of a further non-limiting example, pixel information, such as color distribution, edge change ratio and the like, may be analyzed to identify this continuity over time in order to identify transition frames.

Media content segments, e.g., video shots, 116 and auxiliary data, e.g., images, 11) can be input to a segment-to-title similarity measurement 120, which generates similarity scores 122 for each media content segment 116. A similarity score 122 for a given media content segment 116 provides a measure of similarity between the media content segment 116 of the media content item 112 and the descriptive information, e.g., title, 102. The scores for segments 116 can be used by summary generator 124 to generate summary 126.

With reference to FIG. 1B and in accordance with one or more embodiments, segment-to-title similarity measurement component 120 comprises common feature extractor 130, shared representation learner 132, shared dictionary 134 and similarity scoring engine 136.

The comment feature extractor 130 takes input that includes media content segments 116 and auxiliary data 110, and extracts features from the segments 116 and auxiliary data 110 using the same set of feature descriptors to form feature spaces of the media content item 112 and the auxiliary data 110. By way of a non-limiting example, in the case of images included in the auxiliary data 110, features extracted from the video segments 116 and the images 110 may include color and edge histograms.

In accordance with one or more embodiments, a segment's score measuring its similarity to the media content's 112 descriptive information 102 can be an aggregate of the unit-level score(s) determined for each unit(s), e.g., video frame(s), which is a part of the segment 116. In accordance with one or more such embodiments, a unit-level score may be determined using the media content and auxiliary data feature spaces. Alternatively and in accordance with one or more embodiments, the media content and auxiliary data feature spaces may be used to generate a shared dictionary 134, which can be used to determine a unit-level score.

In accordance with one or more embodiments, the shared dictionary 134 is generated by shared representation learner 132 and comprises a set of canonical patterns common to the media content item 112 and the auxiliary data 110. The patterns of the shared dictionary 134 are those patterns common to, or only those patterns shared by both, the media content item 112 and auxiliary data 110.

In accordance with one or more such embodiments, the shared representation learner 132 generates the shared dictionary 134 in accordance with at least two geometrical factors. One geometrical consideration or constraint is that each media content segment 116, e.g. a video shot, and each of auxiliary data item 110, e.g., an image, can be sufficiently approximated by a convex linear combination of the patterns of shared dictionary 134. Another geometrical consideration or constraint is that each canonical pattern, $z_j$, in the shared dictionary 134 is well approximated jointly by a convex linear combination of media content segments, e.g., video shots, 116 and auxiliary data, e.g., images 110 of auxiliary data 110.

Given the shared dictionary 134, the media content item 112 and the auxiliary data 110, can be approximated using the shared dictionary 134 and coefficients, A and C, determined by the shared representation learner 132 in generating the shared dictionary 134. In accordance with one or more embodiments, the shared dictionary 134 can approximate the media content item 112 independent of its approximation of the auxiliary data 110, while the media content item 112 and the auxiliary data 110 are used together with coefficients B and D learned by the shared representation learner 132 to approximate the shared dictionary 134. Such a joint approximation encourages the shared dictionary 134 to capture canonical patterns that appear in both the media content item 112 and the auxiliary data 110 and to exclude patterns found in either, and not both, of the media content item 112 or the auxiliary data 110.

By way of a non-limiting example, in accordance with one or more embodiments, the shared representation learner 132 solves for, or optimizes, the coefficients A, B, C, D. The optimization can be expressed using the following expression:

$$\min_{A,B,C,D} \|X - ZA\|_F^2 + \|Y - ZC\|_F^2 + \gamma \|XB - YD\|_F^2, \quad \text{Expression (1)}$$

where X is a matrix of features extracted by common feature extractor 130 from the media content item 112, Y is a matrix of common features extracted by feature extractor 130 from the auxiliary data 110, Z represents shared dictionary 134 comprising a set of canonical patterns identified using X and Y, and A, B, C, D are learned coefficients. In accordance with one or more embodiments, X and Y form a feature space of the media content segments 116 and the auxiliary data 110. Furthermore and in accordance with one or more embodiments, Z can be derived from the second geometrical consideration, and can be determined using the following expression:

$$Z = 1/2(XB + YD) \quad \text{Expression (2)}$$

In accordance with one or more embodiments, Z is derived from the second geometrical consideration, and when the second geometrical consideration is completely satisfied, Z may be expressed as Z=XB=YD. In accordance with one or more embodiments, expression (1) may be used to optimize the second geometrical consideration to derive Z, and to optimize the first geometrical consideration. In the pseudocode example shown in FIG. 3, which is discussed in more detail below, line 17 of the pseudocode corresponds to expression (2).

In accordance with one or more embodiments, the common feature extractor 130 extracts the same, or common, features for each segment 116 of the media content item 112 and each item of the auxiliary data 110. In accordance with one or more embodiments, the shared dictionary 134 can comprise a number, p, of canonical patterns, each of which can be represented as a vector. The variable, $\gamma$, can be used, in accordance with one or more embodiments, as a control, or level of enforcement, used in approximating Z. One example of a value of the variable, $\gamma$, is 1.0.

In the example, expression (1) represents a linear combination and optimizes the coefficients A, B, C and D. In accordance with one or more embodiments, shared representation learner 132 optimizes A, B, C and D using a block-coordinate descent (BCD) approach.

In accordance with one or more embodiments, X comprises a set of vectors, each vector in the set corresponding to a unit, e.g., a video frame, of media content item 112 and identifying a set of feature descriptor values for each media content segment 116, and Y comprises a set of vectors, each vector in the set corresponding to a content item, e.g., an image, from the auxiliary data 110 and comprising a set of feature descriptor values. In accordance with one or more such embodiments, the set of feature descriptors used for X and the set of feature descriptors used for Y are the same feature descriptors, e.g., the same types of features can be extracted from media content segments 116 and the auxiliary data 110 by common feature extractor 130. In accordance with one or more embodiments, the set of feature descriptor values extracted for a unit of the media content item 112 can be concatenated to generate a feature vector for the unit of the media content item 112, and the set of feature descriptor values extracted for an auxiliary data item, e.g., an image, from auxiliary data 110 can be concatenated to generate the feature vector for the auxiliary data 110 item.

By way of some non-limiting examples, the common feature descriptor set may comprise one or more feature descriptors that capture global color activity, such as and without limitation one or more color histograms, e.g., RGB (Red Green Blue) and/or HSV (Hue Saturation Value) color histograms, one or more feature descriptors that capture local and global shape information, such as a pyramid of HoG (Histogram of Oriented Gradients), or pHoG (Pyramid of Oriented Gradients), at least one feature descriptor that captures global scene information, such as a GIST scene descriptor, and/or at least one feature descriptor that captures local appearance information, such as SIFT (scale-invariant feature transform) and/or dSIFT (dense Scale-Invariant Feature Transform).

By way of a further non-limiting example, color histograms can be computed on both RGB and HSV images using 32 bins, producing a 192D vector, and the remaining descriptors can be computed on a gray scale image. A pHoG descriptor can be computed over a 4-level pyramid using 8 bins, producing a 680D vector. A GIST descriptor can be computed using 4×4 blocks and 8 orientations per scale, producing a 512D vector. A dSIFT descriptor can be computed using a bin size of 9 and step size of 8, and represented as bag-of-words by learning a codebook of size 256 using k-means on a 5% subset of the descriptors uniformly sampled from the video frames. The descriptors can be concatenated to form a feature vector, e.g., a 1640D feature vector.

In accordance with one or more embodiments, the shared dictionary 134 identifies a number, n, patterns common to both the media content segments 116 and the auxiliary data 110. In accordance with one or more embodiments, a pattern can correspond to a set of feature descriptor values. In accordance with one or more embodiments, the identified patterns are found in the feature descriptors extracted from the media content segments 116 and the auxiliary data 110.

Figure 2:
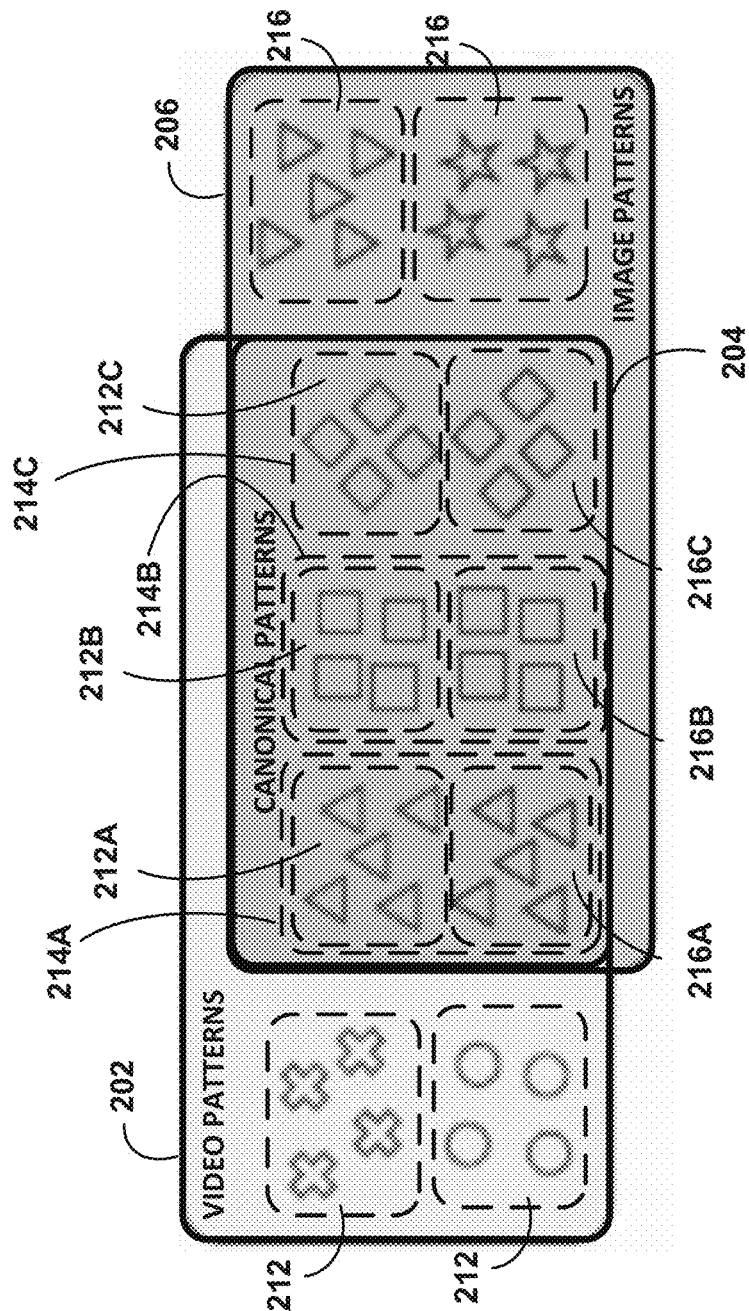

FIG. 2 illustrates canonical, or co-archetypal, patterns in accordance with one or more embodiments of the present disclosure. In the example shown, box 202 includes patterns 212 found in features extracted from shots of a video, box 206 includes patterns 216 found in features extracted from images retrieved using a title, and/or other information associated with the video. The types of features extracted from shots of the video are the same type of features extracted from the retrieved images. Of the video patterns 212 and the image patterns 216, a set of patterns 212A-212B extracted from the video's features and patterns 216A-216C extracted from the images' features are identified by segment-to-title similarity measurement 120, and canonical, or co-archetypal, patterns 214A-214C are identified as being shared by both the video and the retrieved images. The canonical, or co-archetypal, patterns 214A-214C are located in box 204, and each one represents its respective video and image patterns. The video patterns 212 and image patterns 216 outside of box 204 are excluded from being used as canonical, or co-archetypal, patterns.

In accordance with one or more embodiments, the canonical pattern 214A corresponding to elements 212A and 216A can be identified by shared representation learner 132 and added to the shared dictionary 134 for the video content item. Similarly, the canonical pattern 214B corresponding to elements 212B and 216B, as well as the canonical pattern 214C corresponding to elements 212C and 216C, can also be added to the shared dictionary 134.

Figure 3:
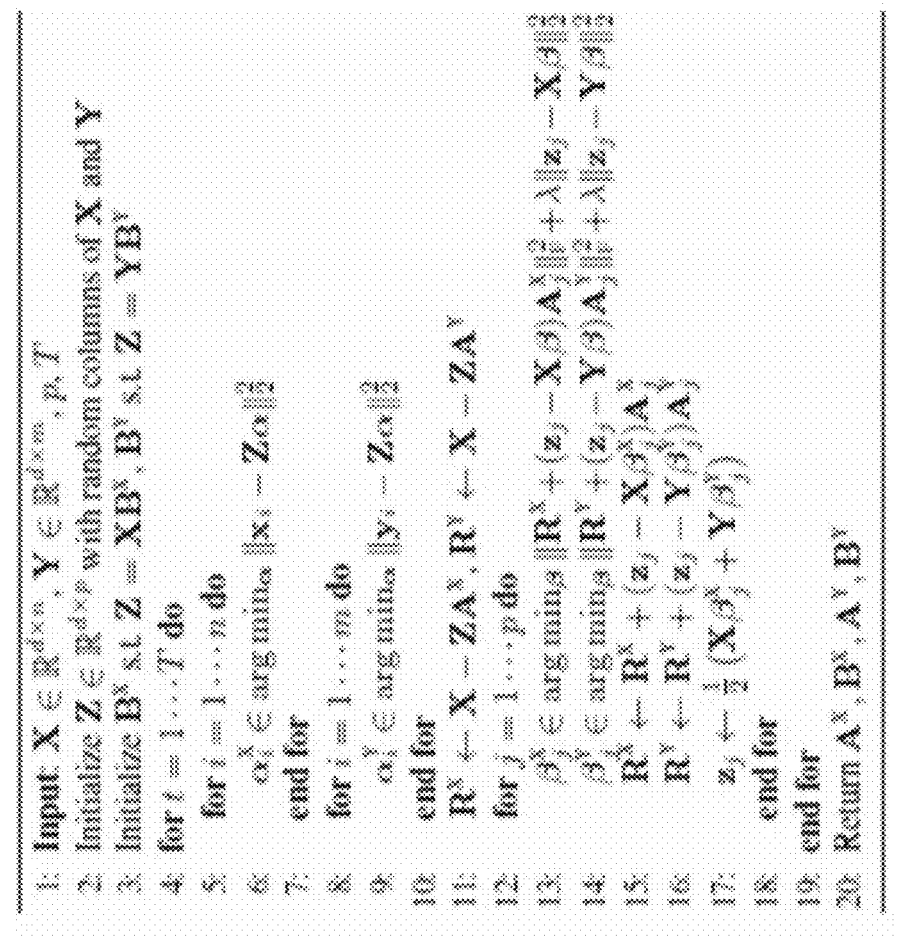

In the example shown in FIG. 3, the shared dictionary 134 can be said to comprise the canonical patterns 214A-214C and that the canonical patterns 214A-214C comprise patterns shared between the video used to generate video patterns 212 and the images used to generate patterns 216. As such, each video frame or shot from the video and each image can be approximated by a convex linear combination of the canonical patterns 214A-214C and a respective coefficient, and each canonical pattern 214A-214C can be approximated by a convex linear combination of the video's shots and the images and respective coefficients. The coefficients can be determined by shared representation learner 132.

More particularly and given canonical patterns 214A-214C, the video can be approximated by a linear combination of patterns 214A-214C and a corresponding coefficient, A, and each image can be approximated by a linear combination of patterns 214A-214C and a corresponding coefficient, C. The video and images can be approximated independent of each other using the canonical patterns 214A-214C, and the canonical patterns 214A-214C can be approximated jointly using the video and the images and respective coefficients B and D. By approximating the canonical patterns 214A-214C using both the video and the images jointly, capturing of canonical patterns that appear in both the video and the images for the shared dictionary 134 is encouraged, and capturing patterns that appear in one of the video and the images but not in the other of the video and the images is discouraged.

In accordance with one or more embodiments, one or more computing devices can use expression (1) to generate shared dictionary 134 and coefficients A, B, C and D. in accordance with the illustrative pseudocode of FIG. 3. In the example, X comprises the feature vector of feature descriptor values for each unit of media content item 112, which vector for the $i^{th}$ unit may be represented as $x_i$, and Y comprises the feature vector feature descriptor values for each item, with vector for the $i^{th}$ may be represented as of auxiliary data 110 content item, p represents the number of canonical patterns in the shared dictionary 134, and T represents a number of iterations.

Lines 5 to 7 of the pseudocode are performed by the one or more computing devices to learn the coefficient, A, which coefficient may be learned by solving a quadratic program on each column vector $\alpha_i^x$ using the following:

$$\min_{\alpha \in \Delta^p} \|x_i - Z\alpha\|_2^2, \qquad \text{Expression (3)}$$

where Z is the shared dictionary 134, a is a coefficient vector of A, where A comprises a coefficient vector, a, for each unit of media content item 112, e.g., coefficient vector, represents the coefficient vector for the $i^{th}$ unit of media content item 112. In accordance with one or more embodiments, each coefficient vector, a, has a dimension p, which corresponds to the number of canonical patterns in shared dictionary 134. The coefficient vector may be an element of the unit simplex vector, $\Delta^p$. In accordance with one or more embodiments, the simplex vector may be represented as:

$$\Delta^p \{\alpha \in \mathbb{R}^p | \Sigma_{j=1}^p \alpha[j] = 1 \text{ and } \alpha[j] \geq 0 \text{ for all } j\} \qquad \text{Expression (4)}$$

In accordance with one or more embodiments, lines 5 to 7 of the pseudocode in the example of FIG. 3 may be used to determine A, comprising a number, n, coefficient vectors, where n is the number of units of media content item 112, and the $i^{th}$ vector may be represented as $\alpha_i^x$, $A_i^x$ or $A_i$. In accordance with one or more embodiments, the matrix of coefficient vectors represented by A may be used with the canonical patterns of the shared dictionary 134 to approximate the media content item 112. By way of a non-limiting example, A may be obtained using a Fast Iterative Shrinkage-Thresholding Algorithm (FISTA).

In accordance with one or more embodiments, a similar approach may be used to determine coefficient, C. In accordance with one or more embodiments, coefficient C may be used with the canonical patterns of shared dictionary 134 in approximating the auxiliary data 110. In accordance with one or more such embodiments, C is a matrix comprising a coefficient vector, $\alpha_i^y$, for each item, e.g., an image, of auxiliary data 110, which coefficient vector has a dimension, p, and may also be represented as $A_i^y$ or $C_i$, for each $i^{th}$ item of auxiliary data 110. In accordance with one or more embodiments, C may be used with the canonical patterns of the shared dictionary 134 in approximating the auxiliary data 110. In the example shown in FIG. 3, the C coefficient may be determined in lines 8 to 10 of the pseudocode.

In the example of FIG. 3, lines 12 to can be performed to obtain coefficients B and D, which may be used with the auxiliary data 110 and the media content item 112 to jointly approximate the canonical patterns of the shared dictionary 134. In accordance with one or more such embodiments, the B coefficient comprises a matrix of p vectors, each of which has a dimension of n, such that B comprises a coefficient vector, $\beta_i^x$, which may also be represented as $B_i^x$ or $B_i$, for each canonical pattern of the shared dictionary and each such coefficient vector has a dimension n, where n is the number of or each unit of media content item 112, and D is a coefficient matrix comprising p vectors, each of which has a dimension of in, such that D comprises a coefficient vector, $\beta_i^y$, which may also be represented as $B_i^y$ or $D_i$, for each canonical pattern of the shared dictionary 134 and each coefficient vector has a dimension in, where in is the number of items of the auxiliary data 110.

In accordance with one or more embodiments, in a case of a low level of noise and variance in the media content item 112, the feature spaces represented by matrices X and Y can be used without the shared dictionary 134 to determine a measure of similarity of each unit of the media content item 112 to each item of the auxiliary data 110. By way of one non-limiting example, an N-nearest neighbor search may be performed for each unit of the media content item 112 to each item of the auxiliary data 110, and the similarity score may be determined by determining an average L2 distance to those N samples found from nearest neighbor search. By way of a further non-limiting example, for each unit of the media content item 112, a Euclidean distance can be computed to each item of auxiliary data 110 using the feature vector in X for the given unit and the feature vector in Y for each given item of auxiliary data 110, and the minimal distance determined for each unit can be used as the unit's unit-level score. For each media content segment 116, its shot-to-title score can be determined based on the unit-level score of each unit that is part of the segment 116. By way of a non-limiting example, the shot-to-title score, e.g., shot score 122, for a segment 116 can be an aggregate of the unit-level score of each unit that comprises the segment 116. For purposes of expression (6) discussed below, the shot-to-title score for the segment 116 can be an inverse of an aggregate of the unit-level score of each unit that comprises the segment 116.

In accordance with one or more embodiments, in a case of high level of noise and/or variance, the shared dictionary 134 may be generated by shared representation learner 132 and used to determine a similarity measure for each unit, $x_i$, of the media content 112 to descriptive information 102. By way of a non-limiting example, the following expression can be used to determine a unit-level score for a unit, $x_i$, of the media content item 112:

$$\text{score}(x_i) = \Sigma_{j=1}^{n} B_i^X \alpha_j^X, \qquad \text{Expression (5)}$$

where $x_i$ is the $i^{th}$ unit, $B_i^X$ is a coefficient vector from B corresponding to the $i^{th}$ unit and $\alpha_j^X$ is a coefficient vector from A corresponding to each $j^{th}$ unit of the n units of the media content item 112. In accordance with one or more embodiments, the shot-to-title similarity score for a media content segment 116 can be computed by taking an average of the per-unit scores determined for the unit(s) of the media content item 112 included in the media content segment 116.

In accordance with one or more embodiments, each unit, $x_i$, of a media content segment 116 is a convex combination of the canonical patterns of the shared dictionary 134, and each canonical pattern, $z_j$, is a convex combination of X, the feature descriptors associated with the units of the media content item 112. Such a chain-reaction-like formulation allows the scoring function to measure how representative a particular unit, $x_i$, of the media content item 112, is in the reconstruction of the media content 112 using the shared dictionary 134. Furthermore, the joint formulation of the shared dictionary 134 using the media content segments lit 6 and the auxiliary data 110 provides an ability to measure a relevance of a media content item unit, $x_i$ to the shared dictionary 134, which is shared between the media content item 112 and the auxiliary data 110 collected using the descriptive information 102 associated with the media content item 112.

In accordance with one or more embodiments, the segment score 122 for each segment 116 of the media content item can be used to generate a summary by selecting one or more of the media content segments 116 using the segment scores 122. By way of a non-limiting example, a number of media content segments 116 having a maximum total score may be selected with or without using a budget parameter, such as and without limitation a desired number of media content segments 116, a desired duration of the summary 126, etc. The budget parameter may comprise more than one budget parameter and may be preset, determined based on a user preference, which may be an express and/or implicit preference.

In accordance with one or more embodiments, a summary of length, l, may be generated using the following optimization expression:

$$\max \Sigma_{i=1}^{s} u_i v_i \text{ subject to } \Sigma_{i=1}^{s} u_i w_i \leq l, u_i \in \{0,1\}, \qquad \text{Expression (6)}$$

where s represents the number of segments 116, $v_i$ represents an importance score of the $i^{th}$ segment 116, and $w_i$ represents the length of the $i^{th}$ segment 116. Expression (6) may be solved using dynamic programming. The summary 126 may be generated by concatenating segments 116 with $u_i \neq 0$ in chronological order.

Advantageously, embodiments of the present disclosure provide a mechanism for generating a summary of a media content item using segments of the media content item identified in an unsupervised manner, such that media segment importance may be determined without using human supervision and/or labeled training data, e.g., training data for media content items with summaries identified in some manner by human labelers familiar with the media content items. Embodiments of the present disclosure do not require human supervision and/or labeled training data. Embodiments determine an importance measure that is directly related to the information, e.g., title, associated with the media content item 112. Since a title associated with the media content item 112 can contain a topic, or topics, of the content of the media content item 112, embodiments of the present disclosure can be used to generate a summary 126, which is related to the topic(s) of the media content item 112.

Figure 4A:
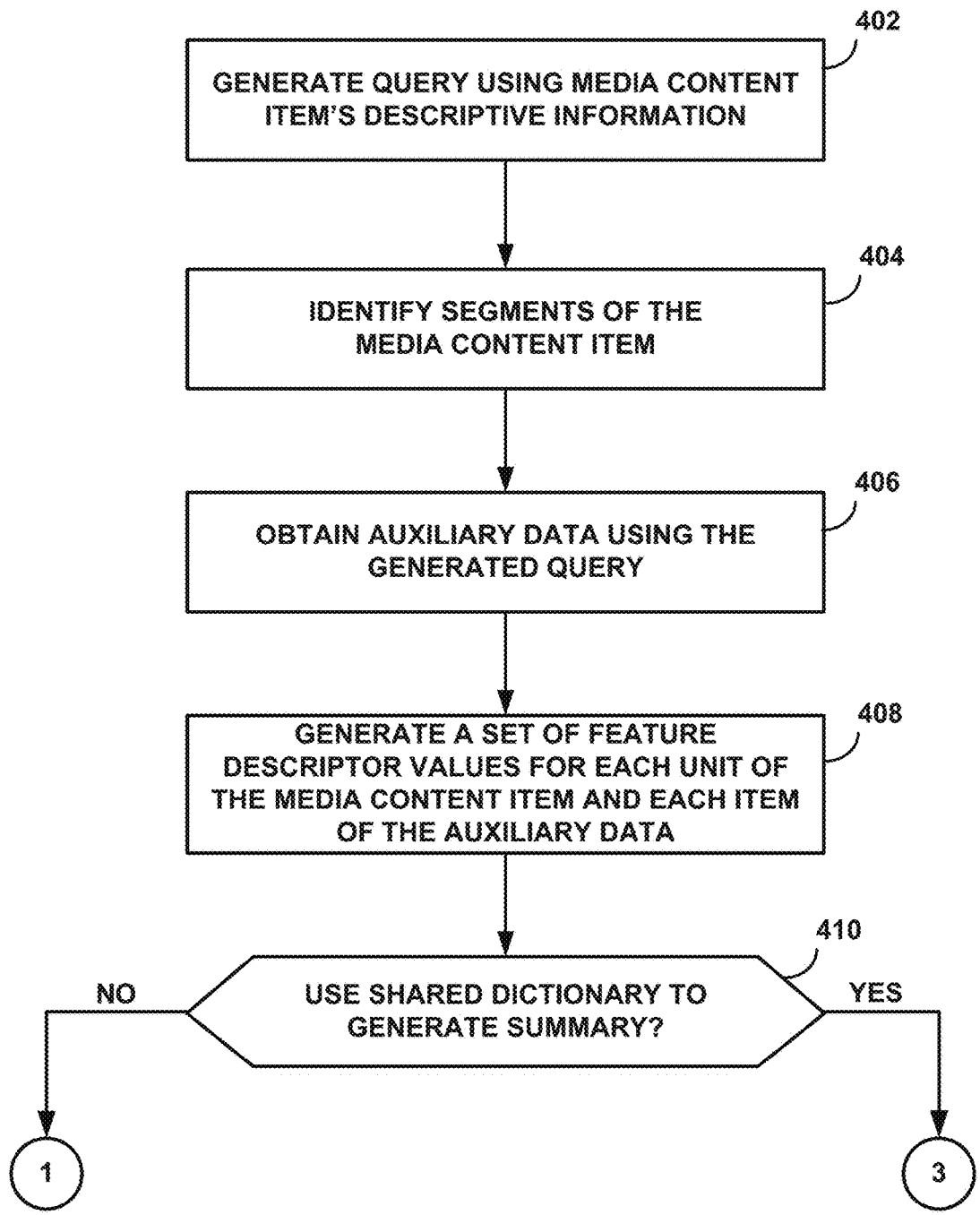
Figure 4B:
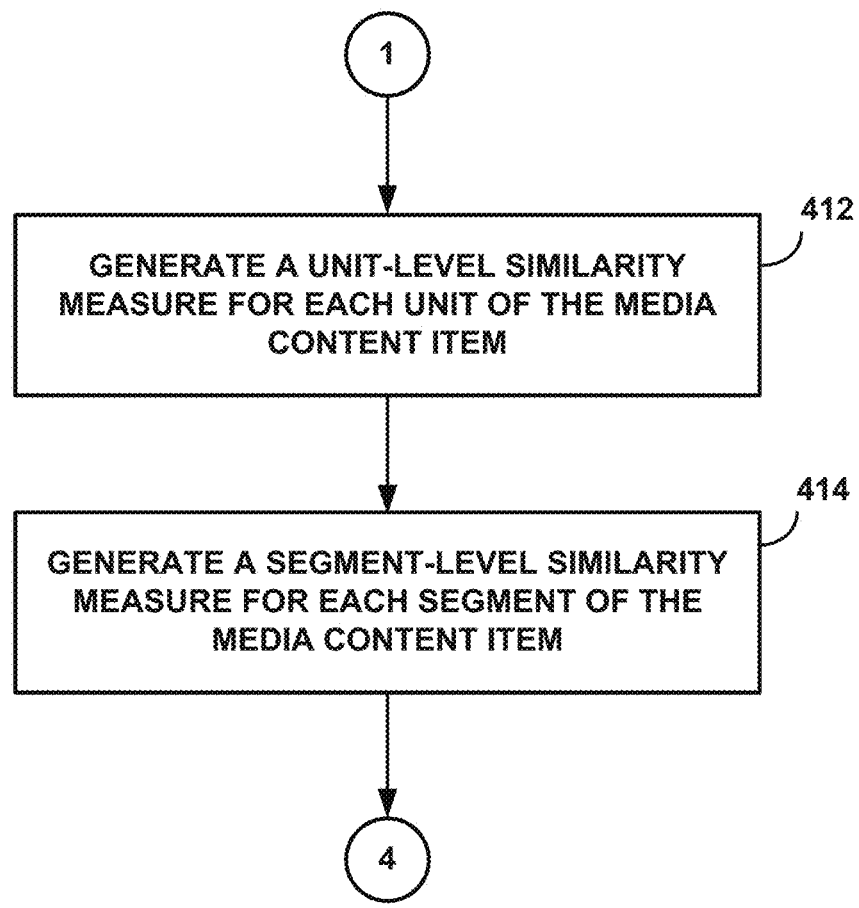
Figure 4C:
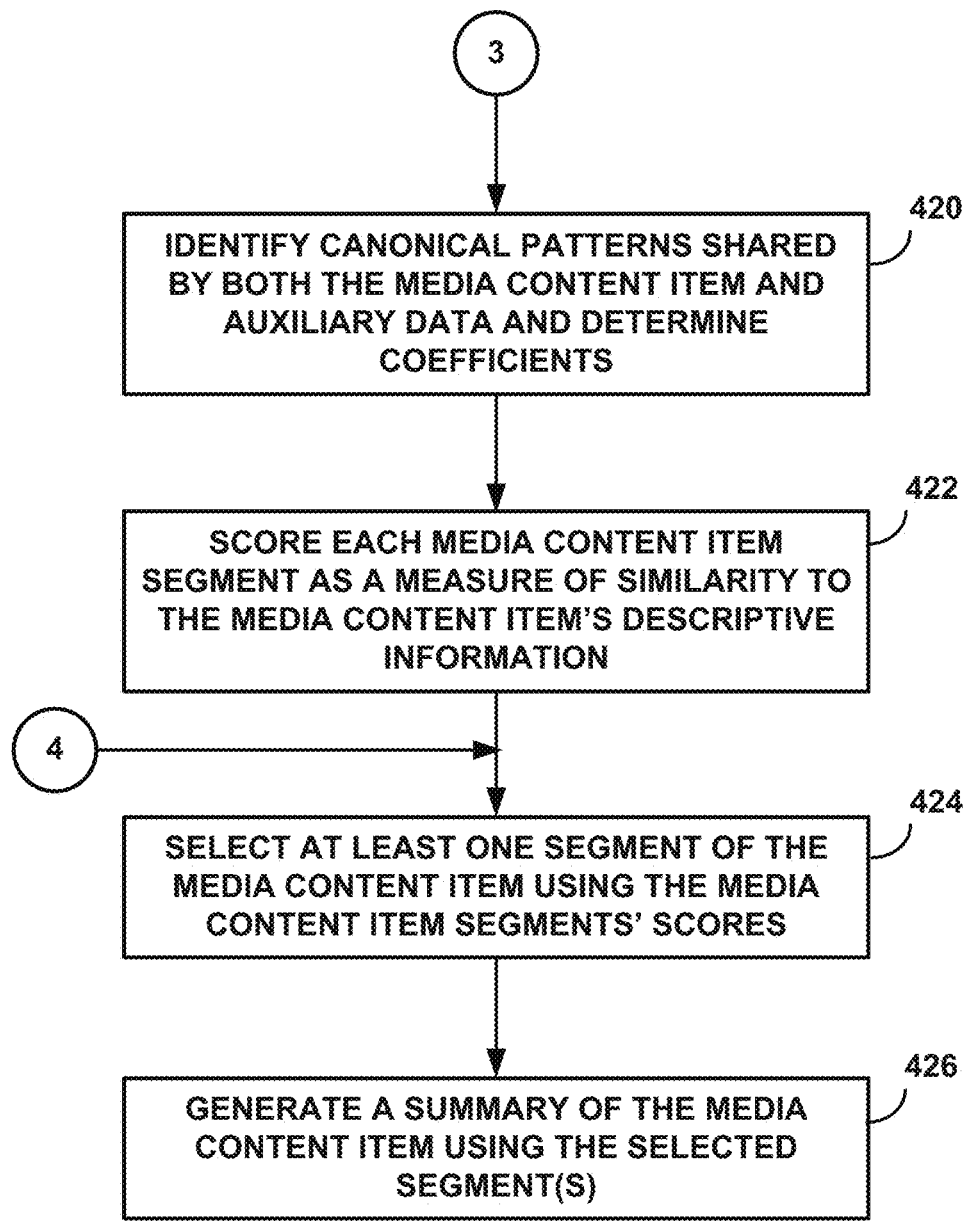

FIG. 4, which comprises FIGS. 4A, 4B and 4C, provides a process flow in accordance with one or more embodiments of the present disclosure. At step 402, the query is generated using descriptive information 102 associated with media content item 112. In accordance with one or more embodiments, the descriptive information may comprise a title of the media content item 112. As discussed herein, in accordance with one or more embodiments, the query may comprise one or more tokens, which tokens may comprise one or more words taken from the descriptive information, n-grams formed from the descriptive information, etc.

At step 404 the media content segments 116 are identified from the media content item 112. In accordance with one or more embodiments, in the case of a video content item, each segment 116 may comprise a sequence of successive incoherent video frames. By way of a non-limiting example, the media content item 112 may be segmented based on transition frames detected in the media content item 112, which transition frames may be detected by analyzing pixel information and searching for sharp discontinuity in time.

At step 406, the generated query may be used to perform a search, e.g., using one or more web search engines, to obtain the auxiliary data 110. At step 408, a set of feature descriptors values is generated for each media content item segment 116 and each item of auxiliary data 110. In accordance with one or more embodiments, a plurality of feature descriptor values can be generated for each segment 116 media content item 112, each feature descriptor value corresponding to a feature of a set of features, and a plurality of feature descriptor values can be generated for each item of auxiliary data 110, each feature descriptor value corresponding to a feature of the set of features used in generating the plurality of feature descriptor values for each segment 116 of the media content item 112.

At step 410, a determination is made whether to generate the summary 126 using the shared dictionary 134. Such a determination may be based on a level of noise and/or variance in the media content item 112. In accordance with one or more embodiments, any mechanism now known or later developed may be used to assess the level of noise and/or variance in the media content item 112, including input from a user.

If the shared dictionary 134 is not being used to generate the summary 126, the shared dictionary 134 need not be generated for purposes of generating summary 126. Instead, the media content item 112 and auxiliary data feature spaces generated at step 408 can be used to generate a unit-level measure of similarity to the descriptive information, and the unit-level similarity measures may be used to generate a segment-level measure of similarity for each segment 116 using the unit-level similarity measures for each unit that comprises a segment 116. FIG. 4B provides an example of a process for generating the segment-level scores in the case that the shared dictionary 134 is not being used.

With reference to FIG. 4B, at step 412, a unit-level similarity measure is determined for each unit of the media content item 112. By way of a non-limiting example, for each unit, the unit-level score may be the shortest Euclidean distance determined for the unit from the Euclidean distances computed for the unit and the items of auxiliary data 110. By way of a further non-limiting example, a Euclidean distance can be computed between each unit and each item of auxiliary data 110 using the unit's features and each auxiliary data item's features, and a unit's unit-level score can be the shortest distance determined for the unit relative to other unit-level scores generated for the unit. At step 414, for each segment 116, a segment-level measure of similarity is determined using the unit-level similarity measure determined for each unit of the segment. In accordance with one or more embodiments, either the unit-level scores or the segment-level scores may be inverted for use in selecting segments 116 for the summary 126. Processing can continue at step 424 of FIG. 4C.

If a determination is made, at step 410 of FIG. 4A, to use the shared dictionary 134, processing continues at step 420 of FIG. 4C. At step 420, the shared dictionary 134 and coefficients A, C and D are determined. As discussed herein, in accordance with one or more embodiments, the shared dictionary 134 and the coefficients may be determined so that each segment media content segment 116 of the media content item 112 and each item of the auxiliary data 110 can be independently and optimally approximated by a combination, e.g., a convex combination, of the plurality of canonical patterns of the shared dictionary and such that each canonical pattern of the shared dictionary 134 can be jointly and optimally approximated by a combination, e.g., a convex combination, of the segments of the media content item 112 and the items of auxiliary data 110.

In accordance with one or more embodiments, the shared dictionary 134 may comprise a number of canonical patterns appearing in, or shared by, both the media content item 112 and the auxiliary data 110. In accordance with one or more embodiments, coefficient A may comprise a first set of coefficients for use with the shared dictionary 134 in approximating the plurality of feature descriptor values of each segment 116 of the media content item 112, coefficient C may comprise a second set of coefficients for use with the shared dictionary 134 in approximating the plurality of feature descriptor values of each item of the auxiliary data 110, coefficients B and D may comprise, respectively, third and fourth sets of coefficients for jointly approximating the shared dictionary 134. More particularly, the third set of coefficients may be used with the plurality of feature descriptor values of segments lit 6 of the media content item 112 and the fourth set of coefficients may be used with the plurality of feature descriptor values of each item of the auxiliary data 134 in approximating the canonical patterns of the shared dictionary 134.

At step 422, each unit of media content item 112 may be scored, where each score generated for a media content item 112 unit may represent a measure of similarity of the media content item 112 unit to the descriptive information 102 of the media content item 112. In accordance with one or more embodiments, the unit-level scoring may be performed using a scoring function such as that shown in expression (5). Furthermore and at step 422, shot score 122, or segment-level measure of similarity of a segment 116 to the descriptive information 102, can be determined for each segment 116. In accordance with one or more embodiments, each segment-level score can be determined to be an average of the unit-level score(s) of the unit(s) that are part of the segment 116.

At step 424, at least one of the media content segments 116 is selected using the scores generated, at step 414 or step 422, for the media content segments 116. In accordance with one or more embodiments, at least one segment 116 of the media content item lit 2 is identified as being more similar to the descriptive information than other segments of the media content item 112 using the scores generated, at step 4 or step 422, for the media content segments 116.

At step 426, a summary, e.g., summary 126, is generated using the at least one media content segment 116 selected at step 424. In accordance with one or more embodiments, the generated summary may be transmitted to one or more user computing devices for presentation at the one or more user computing devices.

Figure 5:
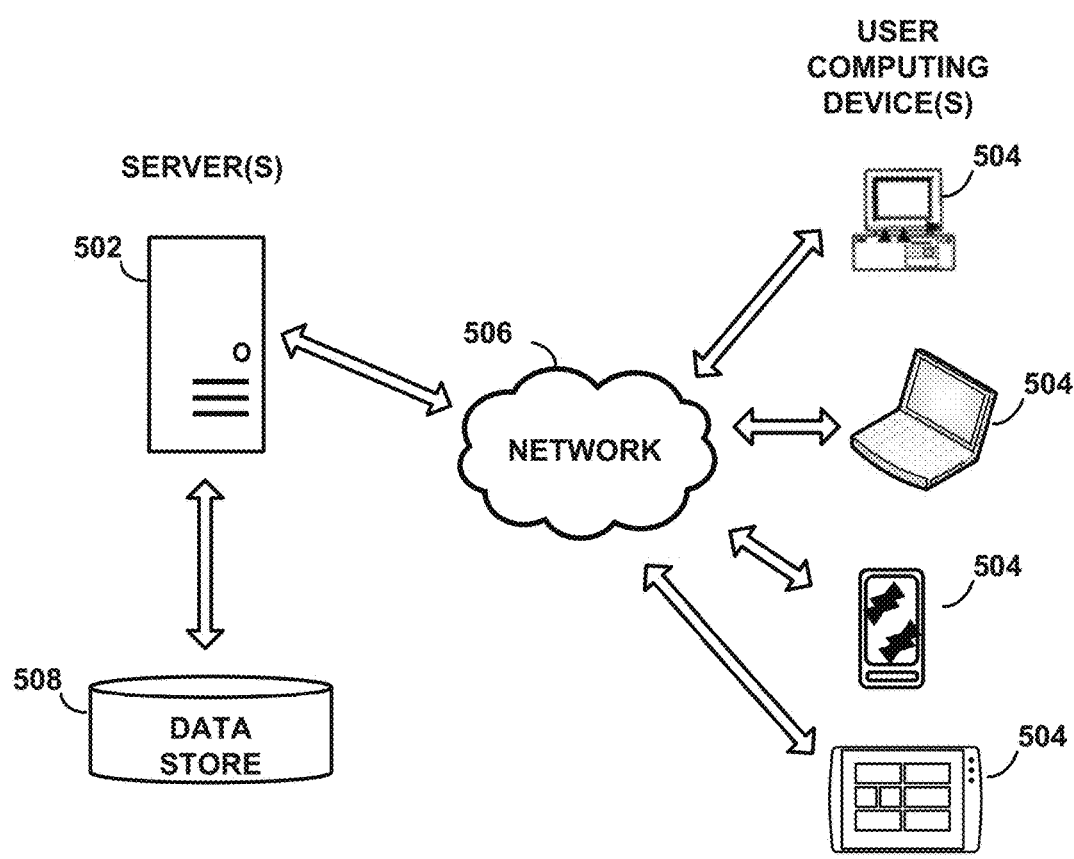
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 502 can be configured to execute program code, instructions, etc. to provide functionality in accordance with one or more embodiments of the present disclosure.

Computing device 502 can serve content to user computing devices 504 using a browser application via a network 506. Data store 508 can be used to store program code to configure a server 502 to functionality in accordance with one or more embodiments of the present disclosure.

The user computing device 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network, intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or $2^{nd}$, $3^{rd}$, or $4^{th}$ generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LYE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digit/communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (P) may include Ipv4 or Ipv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
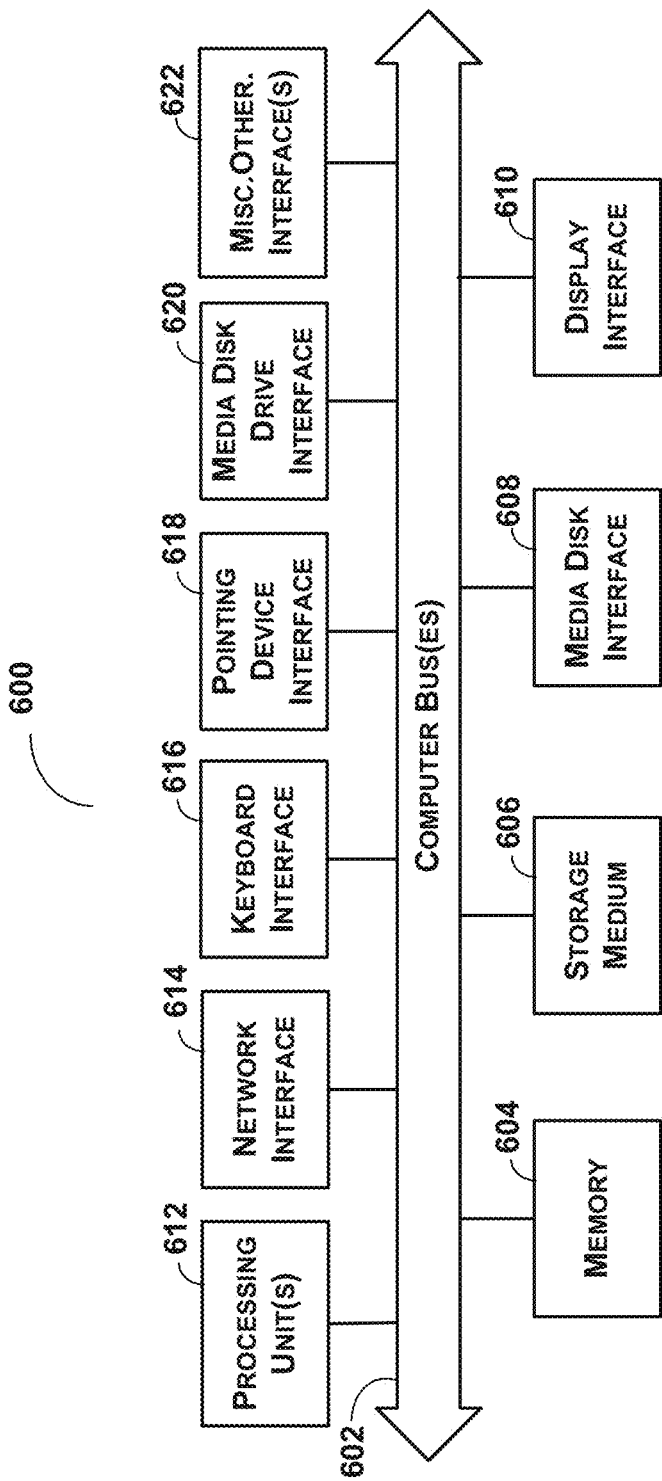
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc. media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
obtaining, by a digital content summarization system server and for a first media content item having associated descriptive information, a plurality of second media content items as auxiliary data, the obtaining using the descriptive information associated with the first media content item, the first media content item comprising a plurality of units;
generating, by the digital content summarization system server, a media content item feature space comprising a first number of feature vectors comprising feature descriptor values representing the first media content item, the generating further comprising generating an auxiliary data feature space comprising a second number of feature vectors comprising feature descriptor values representing the plurality of second media content items as the auxiliary data, obtained using the descriptive information;
identifying, by the digital content summarization system server, a plurality of segments of the first media content item, each segment comprising at least one unit of the first media content item's plurality of units;
scoring, by the digital content summarization system server, each segment of the plurality of segments of the first media content item, scoring a segment of the plurality of segments comprising determining a distance between the auxiliary data feature space and at least one feature vector of the first number of feature vectors, the at least one feature vector representing the segment, each segment's score representing a measure of similarity of the segment to the descriptive information represented by the auxiliary data feature space;

identifying, by the digital content summarization system server, at least one segment of the plurality of segments of the first media content item as more similar to the descriptive information, based on its determined distance to the auxiliary data feature space representing the descriptive information, relative to others of the plurality of segments using the scoring of the plurality of segments; and generating, by the digital content summarization system server, a summary of the first media content item, the summary comprising the at least one segment, of the plurality of segments of the first media content item, identified as being more similar to the descriptive information.

2. The method of claim 1, the descriptive information comprising a title of the first media content item.

3. The method of claim 1, scoring further comprising:
determining, for each segment, a unit-level score for each of the at least one unit of the segment, determining the unit-level score for a unit comprising determining a distance between the auxiliary data feature space and a feature vector of the first number of feature vectors, the feature vector representing the unit, each unit level score representing a measure of similarity of a respective one of the at least one unit to the descriptive information represented by the auxiliary data feature space; and
scoring each segment using the unit-level score determined for each of the at least one unit of the segment.

4. The method of claim 3, each segment's score comprising an average unit-level score determined using each unit-level score determined for each of the at least one unit of the segment.

5. The method of claim 3, the first media content item is a video content item, each unit of the first media content item is a frame and each segment comprises at least one frame.

6. The method of claim 1, generating a media content item feature space and an auxiliary data feature space further comprising:
generating, by the digital content summarization system server, the media content item feature space by generating, for each of the plurality of units of the first media content item, a plurality of feature descriptor values, each feature descriptor value corresponding to a feature of a set of features; and
generating, by the digital content summarization system server, the auxiliary data feature space by generating, for each second media content item of the plurality of second media content items as the auxiliary data, a plurality of feature vectors each comprising a plurality of feature descriptor values, each feature descriptor value of the plurality of feature descriptor values corresponding to a feature of the set of features used in generating the plurality of feature descriptor values for each unit of the second media content item.

7. The method of claim 1, the scoring further comprising:
determining, by the digital content summarization system server and using the media content item feature space and the auxiliary data feature space, a shared dictionary comprising a plurality of canonical patterns shared by the first media content item and the auxiliary data; and
scoring, by the digital content summarization system server, the plurality of segments of the first media content item, for each segment of the plurality of segments, the scoring comprising determining a measure of similarity of the segment to the descriptive information using the shared dictionary.

8. The method of claim 7, the plurality of canonical patterns appear in both the first media content item and the auxiliary data.

9. The method of claim 7, the determining further comprising:
determining a first set of coefficients for use with the shared dictionary in approximating the plurality of feature descriptor values of each unit of the plurality of units of the first media content item;
determining a second set of coefficients for use with the shared dictionary in approximating the plurality of feature descriptor values of each second media content item of the plurality of second media content items of the auxiliary data; and
determining third and fourth sets of coefficients, the third set of coefficients for use with the plurality of feature descriptor values of each unit of the plurality of units and the fourth set of coefficients for use with the plurality of feature descriptor values of each second media content item of the plurality of second media content items of auxiliary data in approximating the shared dictionary.

10. The method of claim 9, the scoring further comprising:
scoring each unit of the plurality of units of the first media content item, the scoring comprising determining a unit-level score for each unit representing the unit's measure of similarity to the first media content item's descriptive information using a plurality of coefficients from the first and third sets of coefficients.

11. The method of claim 7, the determining further comprising:
learning the shared dictionary's canonical patterns such that each unit of the plurality of units of the first media content item and each second media content item of the plurality of second media content items of the auxiliary data is independently approximated by a combination of the plurality of canonical patterns of the shared dictionary and such that each canonical pattern of the plurality of canonical patterns of the shared dictionary is jointly approximated by a combination of the plurality of units of the first media content item and the plurality of second media content items of the auxiliary data.

12. The method of claim 11, each unit of the first media content item and each second media content item of the plurality of second media content items of the auxiliary data is independently approximated by a convex combination of the plurality of canonical patterns of the shared dictionary and each canonical pattern of the plurality of canonical patterns of the shared dictionary is jointly approximated by a convex combination of the plurality of units of the first media content item and the plurality of second media content items of the auxiliary data.

13. A digital content summarization system server comprising:
a processor and a non-transitory storage medium for tangibly storing thereon program logic for execution by the processor, the stored program logic comprising:
obtaining logic executed by the processor for obtaining, for a first media content item having associated descriptive information, a plurality of second media content items as auxiliary data, the obtaining using the descriptive information associated with the first media content item, the first media content item comprising a plurality of units;

generating logic executed by the processor for generating a media content item feature space comprising a first number of feature vectors comprising feature descriptor values representing the first media content item, the generating further comprising generating an auxiliary data feature space comprising a second number of feature vectors comprising feature descriptor values representing the plurality of second media content items as the auxiliary data, obtained using the descriptive information;

identifying logic executed by the processor for identifying a plurality of segments of the first media content item, each segment comprising at least one unit of the first media content item's plurality of units;

scoring logic executed by the processor for scoring each segment of the plurality of segments of the first media content item, scoring a segment of the plurality of segments comprising determining a distance between the auxiliary data feature space and at least one feature vector of the first number of feature vectors, the at least one feature vector representing the segment, each segment's score representing a measure of similarity of the segment to the descriptive information represented by the auxiliary data feature space;

identifying logic executed by the processor for identifying at least one segment of the plurality of segments of the first media content item as more similar to the descriptive information, based on its determined distance to the auxiliary data feature space representing the descriptive information, relative to others of the plurality of segments using the scoring of the plurality of segments; and generating logic executed by the processor for generating a summary of the first media content item, the summary comprising the at least one segment of the plurality of segments of the first media content item, identified as being more similar to the descriptive information.

14. The digital content summarization system server of claim 13, the descriptive information comprising a title of the first media content item.

15. The digital content summarization system server of claim 13, the scoring logic for scoring further comprising:
determining logic executed by the processor for determining, for each segment, a unit-level score for each of the at least one unit of the segment t, determining the unit-level score for a unit comprising determining a distance between the auxiliary data feature space and a feature vector of the first number of feature vectors, the feature vector representing the unit, each unit level score representing a measure of similarity of a respective one of the at least one unit to the descriptive information represented by the auxiliary data feature space; and
scoring logic executed by the processor for scoring each segment using the unit-level score determined for each of the at least one unit of the segment.

16. The digital content summarization system server of claim 15, each segment's score comprising an average unit-level score determined using each unit-level score determined for each of the at least one unit of the segment.

17. The digital content summarization system server of claim 15, the first media content item is a video content item, each unit of the first media content item is a frame and each segment comprises at least one frame.

18. The digital content summarization system server of claim 13, the generating logic for generating a media content item feature space and an auxiliary data feature space further comprising:
generating logic executed by the processor for generating the media content item feature space by generating, for each of the plurality of units of the first media content item, a plurality of feature descriptor values, each feature descriptor value corresponding to a feature of a set of features; and
generating logic executed by the processor for generating the auxiliary data feature space by generating, for each second media content item of the plurality of second media content items as the auxiliary data, a plurality of feature vectors each comprising a plurality of feature descriptor values, each feature descriptor value of the plurality of feature descriptor values corresponding to a feature of the set of features used in generating the plurality of feature descriptor values for each unit of the second media content item.

19. The digital content summarization system server of claim 13, the scoring logic further comprising:
determining logic executed by the processor for determining, using the media content item feature space and the auxiliary data feature space, a shared dictionary comprising a plurality of canonical patterns shared by the first media content item and the auxiliary data; and
scoring logic executed by the processor for scoring the plurality of segments of the first media content item, for each segment of the plurality of segments, the scoring comprising determining a measure of similarity of the segment to the descriptive information using the shared dictionary.

20. The digital content summarization system server of claim 19, the plurality of canonical patterns appear in both the first media content item and the auxiliary data.

21. The digital content summarization system server of claim 19, the determining logic for determining a shared dictionary further comprising:
determining logic executed by the processor for determining a first set of coefficients for use with the shared dictionary in approximating the plurality of feature descriptor values of each unit of the plurality of units of the first media content item;
determining logic executed by the processor for determining a second set of coefficients for use with the shared dictionary in approximating the plurality of feature descriptor values of each second media content item of the plurality of second media content items of the auxiliary data; and
determining logic executed by the processor for determining third and fourth sets of coefficients, the third set of coefficients for use with the plurality of feature descriptor values of each unit of the plurality of units and the fourth set of coefficients for use with the plurality of feature descriptor values of each second media content item of the plurality of second media content items of auxiliary data in approximating the shared dictionary.

22. The digital content summarization system server of claim 21, the scoring logic for scoring the plurality of segments of the media content item further comprising:
scoring logic executed by the processor for scoring each unit of the plurality of units of the first media content item, comprising determining logic executed by the one or more processors for determining a unit-level score for each unit representing the unit's measure of similarity to the first media content item's descriptive information using a plurality of coefficients from the first and third sets of coefficients.

23. The digital content summarization system server of claim 19, the determining logic for determining the shared dictionary further comprising:
learning logic executed by the processor for learning the shared dictionary's canonical patterns such that each unit of the plurality of units of the first media content item and each second media content item of the plurality of second media content items of the auxiliary data is independently approximated by a combination of the plurality of canonical patterns of the shared dictionary and such that each canonical pattern of the plurality of canonical patterns of the shared dictionary is jointly approximated by a combination of the plurality of units of the first media content item and the plurality of second media content items of the auxiliary data.

24. The digital content summarization system server of claim 23, each unit of the first media content item and each second media content item of the plurality of second media content items of the auxiliary data is independently approximated by a convex combination of the plurality of canonical patterns of the shared dictionary and each canonical pattern of the plurality of canonical patterns of the shared dictionary is jointly approximated by a convex combination of the plurality of units of the first media content item and the plurality of second media content items of the auxiliary data.

25. A computer readable non-transitory storage medium for tangibly storing thereon computer readable instructions that when executed by a digital content summarization system server perform a method comprising:
obtaining, for a first media content item having associated descriptive information, a plurality of second media content items as auxiliary data, the obtaining using the descriptive information associated with the first media content item, the first media content item comprising a plurality of units;
generating a media content item feature space comprising a first number of feature vectors comprising feature descriptor values representing the first media content item, the generating further comprising generating an auxiliary data feature space comprising a second number of feature vectors comprising feature descriptor values representing the plurality of second media content items as auxiliary data, obtained using the descriptive information;
identifying a plurality of segments of the first media content item, each segment comprising at least one unit of the first media content item's plurality of units;
scoring each segment of the plurality of segments of the first media content item, scoring a segment of the plurality of segments comprising determining a distance between the auxiliary data feature and at least one feature vector of the first number of feature vectors, the at least one feature vector representing the segment, each segment's score representing a measure of similarity of the segment to the descriptive information represented by the auxiliary data feature space;
identifying at least one segment of the plurality of segments of the first media content item as more similar to the descriptive information, based on its determined distance to the auxiliary data feature space representing the descriptive information relative to others of the plurality of segments using the scoring of the plurality of segments; and
generating a summary of the first media content item, the summary comprising the at least one segment of the plurality of segments of the first media content item, identified as being more similar to the descriptive information.

26. The computer readable non-transitory storage medium of claim 25, the descriptive information comprising a title of the first media content item.

27. The computer readable non-transitory storage medium of claim 25, scoring further comprising:
determining, for each segment, a unit-level score for each of the at least one unit of the segment, determining the unit-level score for a unit comprising determining a distance between the auxiliary data feature space and a feature vector of the first number of feature vectors, the feature vector representing the unit, each unit level score representing a measure of similarity of a respective one of the at least one unit to the descriptive information represented by the auxiliary data feature space; and
scoring each segment using the unit-level score determined for each of the at least one unit of the segment.

28. The computer readable non-transitory storage medium of claim 27, each segment's score comprising an average unit-level score determined using each unit-level score determined for each of the at least one unit of the segment.

29. The computer readable non-transitory storage medium of claim 27, the first media content item is a video content item, each unit of the first media content item is a frame and each segment comprises at least one frame.

30. The computer readable non-transitory storage medium of claim 25, generating a media content item feature space and an auxiliary data feature space further comprising:
generating the media content item feature space by generating, for each of the plurality of units of the first media content item, a plurality of feature descriptor values, each feature descriptor value corresponding to a feature of a set of features; and
generating the auxiliary data feature space by generating, for each second media content item of the plurality of second media content items as the auxiliary data, a plurality of feature vectors each comprising a plurality of feature descriptor values, each feature descriptor value of the plurality of feature descriptor values corresponding to a feature of the set of features used in generating the plurality of feature descriptor values for each unit of the second media content item.

31. The computer readable non-transitory storage medium of claim 25, scoring further comprising:
determining, using the media content item feature space and the auxiliary data feature space, a shared dictionary comprising a plurality of canonical patterns shared by the first media content item and the auxiliary data; and
scoring the plurality of segments of the first media content item, for each segment of the plurality of segments, the scoring comprising determining a measure of similarity of the segment to the descriptive information using the shared dictionary.

32. The computer readable non-transitory storage medium of claim 31, the plurality of canonical patterns appear in both the first media content item and the auxiliary data.

33. The computer readable non-transitory storage medium of claim 31, determining a shared library further comprising:
determining a first set of coefficients for use with the shared dictionary in approximating the plurality of feature descriptor values of each unit of the plurality of units of the first media content item;

determining a second set of coefficients for use with the shared dictionary in approximating the plurality of feature descriptor values of each second media content item of the plurality of second media content items of the auxiliary data; and determining third and fourth sets of coefficients, the third set of coefficients for use with the plurality of feature descriptor values of each unit of the plurality of units and the fourth set of coefficients for use with the plurality of feature descriptor values of each second media content item of the plurality of second media content items of auxiliary data in approximating the shared dictionary.

34. The computer readable non-transitory storage medium of claim 33, scoring the plurality of segments of the media content item further comprising:

scoring each unit of the plurality of units of the first media content item, the scoring comprising determining a unit-level score for each unit representing the unit's measure of similarity to the first media content item's descriptive information using a plurality of coefficients from the first and third sets of coefficients.

35. The computer readable non-transitory storage medium of claim 31, determining a shared library further comprising:

learning the shared dictionary's canonical patterns such that each unit of the plurality of units of the first media content item and each second media content item of the plurality of second media content items of the auxiliary data is independently approximated by a combination of the plurality of canonical patterns of the shared dictionary and such that each canonical pattern of the plurality of canonical patterns of the shared dictionary is jointly approximated by a combination of the plurality of units of the first media content item and the plurality of second media content items of the auxiliary data.

36. The computer readable non-transitory storage medium of claim 35, each unit of the first media content item and each second media content item of the plurality of second media content items of the auxiliary data is independently approximated by a convex combination of the plurality of canonical patterns of the shared dictionary and each canonical pattern of the plurality of canonical patterns of the shared dictionary is jointly approximated by a convex combination of the plurality of units of the first media content item and the plurality of second media content items of the auxiliary data.

* * * * *